United States Patent [19]

Dötsch et al.

[11] Patent Number: 5,102,593
[45] Date of Patent: Apr. 7, 1992

[54] PROCESS FOR PRODUCING CARBON-BONDED REFRACTORY CERAMIC MOLDINGS

[75] Inventors: Lorenz Dötsch, Vallendar; Helmut Schüller, Königswinter; Andreas Batton, Windeck; Jens Decker, Höhr-Grenzhausen, all of Fed. Rep. of Germany

[73] Assignee: Radex-Heraklith Industriebeteiligungs Aktiengesellschaft, Wein, Austria

[21] Appl. No.: 531,899

[22] Filed: Jun. 1, 1990

[30] Foreign Application Priority Data

Jun. 2, 1989 [DE] Fed. Rep. of Germany ....... 3917965

[51] Int. Cl.$^5$ .................... B05D 1/36; B05D 7/00; B05D 1/02
[52] U.S. Cl. .................... 264/63; 427/202; 427/205; 427/214; 427/215; 427/376.1; 427/424; 427/427
[58] Field of Search .............. 264/29.2, 29.3, 63; 427/202, 203, 204, 205, 214, 215, 376.1, 424, 427

[56] References Cited

U.S. PATENT DOCUMENTS

4,521,357 6/1985 Kernion et al. .................... 264/63
4,788,080 11/1988 Hojo et al. .................... 427/204

Primary Examiner—James Lowe
Assistant Examiner—Christopher A. Fiorilla
Attorney, Agent, or Firm—John F. A. Earley; John F. A. Earley, III

[57] ABSTRACT

A process for producing refractory, carbon-bonded ceramic moldings includes spraying a low-viscosity organic containing carbon containing binder onto a coarse fraction of a refractory component, the coarse fraction having a particle size larger then 0.5 mm while maintaining the coarse refractory fraction having a particle size smaller then 0.5 mm onto the coated granules, pressing the granules thus produced into moldings, and subsequently curing the organic binder in the moldings, and tempering or firing the moldings.

25 Claims, No Drawings

PROCESS FOR PRODUCING CARBON-BONDED REFRACTORY CERAMIC MOLDINGS

DESCRIPTION

The present invention pertains to a process for producing refractory, carbon-bonded ceramic moldings which are used, e.g., as lining bricks, valve plates for sliding gate valves, or spouts in metallurgical melting furnaces.

As can be determiend from EP-A-242,849 and DE-C-37,36,680, prior art, carbon-bonded, refractory materials consist of a mixture of refractory particles, such as alumina, zirconia, clays, silicon carbide, silica, or the like, as well as carbon in the form of flake graphite, amorphous graphite, coke, or the like. Carbon-containing organic binders, such as various resins, are used as well.

The products have good thermal shock resistance, and some of them show favorable resistance to attack by slag.

However, it is disadvantageous that the resin component can usually be dispersed only inhomogeneously in the refractory matrix component, especially when fairly large amounts of graphite or carbon black are used. This leads not only to an unfavorable specific gravity, but especially to the formation of compression layers during production.

The basic task of the present invention is to propose a process according to which refractory, carbon-bonded ceramic moldings possessing improved properties can be produced. Especially the workability as well as the corrosion and erosion resistance should be improved.

Starting from the consideration that this goal can be achieved mainly through a homogeneous, fine particulate texture, the present invention is based on the discovery of producing the various components of the mixture in the granular form and applying fine fractions in the process by spraying or strewing onto coarse fractions. A kind of "breading" of individual granules is thus achieved, which will subsequently both have a favorable effect during pressing and permit increased surface reactions to take place between the individual components, thus leading to the formation of homogeneous, compact bodies with favorable abrasion properties.

A high degree of homogeneity of the individual mixture components is achieved through the coating (wetting) of the coarse fraction with the different components of the fine fraction; however, good free-flowing properties of the material are also guaranteed, because the individual granules do not stick together during the processing, and the effect of the binder, which is responsible for the development of the green strength, begins or is activated only by the subsequent compaction process.

In its most general embodiment, the process according to the present invention is characterized by the following steps:

spraying of a low-viscosity organic binder onto a coarse fraction of the refractory component with a particle size greater than 0.5 mm, while the coarse refractory fraction is kept in motion during the spraying, spraying or strewing a fine refractory fraction with a particle size smaller than 0.5 mm onto the granules formed beforehand or in situ, removal of the granules thus obtained and pressing into moldings, and subsequent curing of the organic binder, tempering and/or firing.

Various characteristics are responsible for the good results achieved according to the present invention. The classification of the refractory matrix material into a coarse fraction and a fine fraction should first be mentioned. The coarse fraction will subsequently assume the function of a "support granule" in the molding, whereas the fine fraction fills out corners between the coarser particles and, together with the other components of the mixture, which had already been sprayed on, it makes it possible to produce pressed, refractory moldings with already high green strength. However, the characteristic that the fine fraction is not simply mixed in mechanically but, like the organic binder, is sprayed or strewn onto the coarse fraction, is also particularly important. The above-described "breading," i.e., high surface coverage of the coarse fraction or the granules formed from this fraction, is thus achieved. It was found in this connection that nearly complete coverage of the surface of the refractory matrix material and consequently excellent binding of the particles to one another, especially after the pressing process, can be achieved even with very small amounts of resin because of the spraying method employed. However, the other fine components, which also include other carbon-containing materials, such as graphite, carbon black, or petroleum coke, besides the resin, also lead in the same way to markedly improved reactivity and binding capacity of the particles with each other, compared with prior-art processing methods. However, extremely homogeneous distribution, in a plurality of layers if desired, is achieved mainly by spraying, so that an extremely homogeneous structure is obtained after the pressing process as well.

Not only is the structure more homogeneous, but stronger bonding is also achieved, especially in the area of the matrix, as a result of which the specific gravity and consequently the corrosion resistance and the erosion resistance of the finished products are improved. Likewise, very intensive sintering, which is advantageous, is also achieved if the products are fired.

The fine fractions can be introduced in different ways. Spraying or strewing on in a fluidized bed, in which the coarse refractory fraction is fluidized homogeneously, is preferable; in situ granulation now takes place due to the addition of the organic binder. In an alternative embodiment, the fine component is added on a granulating plate. However, the coarse refractory granules are in motion in all cases, so that complete coverage of the surface with the organic binder and consequently agglomeration of individual particles into granules can occur.

The other refractory components, which are preferably sprayed or strewn on subsequently, stick to the binder layer applied beforehand and fill out corner gaps between the granules formed. The further carbon-containing component, which is introduced, for example, as flake graphite, is also deposited, likewise in a homogeneous distribution, in the same way on the surface formed previously.

The fine refractory fraction or the further carbon-containing component is preferably first mixed with alcohol and water and is sprayed in as a liquid suspension.

The process according to the present invention is suitable for producing refractory moldings from a very great variety of refractory materials. For example, the coarse refractory component may consist of $Al_2O_3$, $ZrO_2$, $SiO_2$, zircon mullite, $TiO_2$, $Cr_2O_3$, and/or SiC.

The fine refractory component may contain $Al_2O_3$, $ZrO_2$, $TiO_2$, $Cr_2O_3$, zircon mullite, various carbides, nitrides or borides, SiAlON compounds or metals, such as Cr or Si.

The organic binder is preferably a resin, such as phenol-resol resin, phenol-novolak resin, furan resin, and/or epoxy resin.

Particularly high densities are reached by using a fine refractory fraction with a maximum particle size of 0.1 mm, especially if a considerable percentage of this material occurs in the micronized form. These are defined as particles with a particle size below 0.01 mm. This material, which evidently also assumes a certain binding function in conjunction with surface coating, should account for at least 30 wt. % and preferably at least 50 wt. % of the fine fraction.

As was described above, increased surface activity of the particles is thus achieved, which is manifested by improved sintering behavior, especially during firing.

According to an advantageous embodiment, a chemical binder, e.g., an organically modified phosphoric acid, is also sprayed onto the granules formed in advance, besides the above-mentioned organic binder. Due to the similarly excellent, homogeneous distribution of this binder in the matrix material, it is achieved that chemical bonding, which imparts great strength to the moldings, develops simply during heating of the moldings, so that a subsequent firing can be dispensed with.

Besides the formation of chemical bridge bonds between the individual particles, especially the carbon skeleton formed between the coarse and fine components, exerts a favorable effect in terms of a certain "flexibility" of the structure during pressing. Two effects are thus achieved at the same time. Besides great strength, the flexibility of the structure leads to favorable properties of the moldings in terms of their spalling resistance.

The layer formation mentioned in the introduction is thus also prevented.

It is, of course, possible to introduce the fine refractory component together with the other carbon-containing component and/or the organic binder. However, premixing the starting substances and treating them so that the mixture will subsequently readily lend itself to spraying is advantageous for homogeneous distribution. The use of resins with low viscosity (e.g., 600–1000 centipoise) has also been proposed for this reason.

If the fine component is sprayed on as a suspension in alcohol or water, the liquid components will subsequently evaporate either immediately or during tempering.

The specific batch (selection of the refractory materials, percentages of the coarse and fine fractions, selection of the organic and/or inorganic binder, as well as the other carbon-containing component, etc.) depends, in the particular case, on the material properties required, as well as the specific requirement of the steel mill.

For example, it may be advantageous to add a certain percentage of metallic Si, which leads to the strength-increasing formation of SiC during firing in the presence of carbon.

Furthermore, it may be advantageous to add an additive such as $Si_3N_4$. Due to the release of nitrogen at elevated temperatures, a vapor pressure develops in the pores and capillaries, and this vapor pressure will exert an infiltration-inhibiting effect during subsequent use. These additives, which are also subsumed under the term "fine refractory fraction," are sprayed onto the coarse refractory fraction or the granules formed preferably in the gel form.

The present invention will be explained in greater detail below on the basis of an example.

The batch has the following components:

| Component | Particle Fraction (mm) | Percentage, Wt. % |
|---|---|---|
| 1. Tabular alumina | 0.5–1.2 | 30–60 |
| 2. Zirconia | 0.5–1.0 | 10–20 |
| 3. Zircon mullite | less than 0.1 | 10–20 |
| 4. Electrocorundum | less than 0.01 | 10–20 |
| 5. Flake graphite | less than 0.01 | 5–10 |
| 6. Phenolic resin | as a gel | 3–8 |

The sum of the components of the mixture will always be 100 wt. %.

Components 1 and 2 are first premixed. The mixture is subsequently charged into a fluidized bed chamber and fluidized there. The phenolic resin of low viscosity is subsequently sprayed onto the coarse fraction. The surfaces of the coarse fraction are wetted completely and homogeneously. Agglomeration of individual particles of the coarse fraction into granules takes place at the same time. Components 3, 4 and 5, which were also premixed, are made into a suspension with alcohol and subsequently also sprayed into the fluidized bed reactor. The surfaces of the granules formed are again wetted completely and homogeneously with another layer.

The granular material is subsequently removed and pressed under a pressure of 100 $N/mm^2$. A fresh specific gravity of 2.8 $g/cm^3$ is obtained.

Formation of compression layers was not seen.

The moldings were subsequently tempered at 400 degrees C. and finally fired at 1550 degrees C. under reducing conditions.

They are characterized by a homogeneous, fine particulate, compact structure, low susceptibility to corrosion and erosion, as well as good spalling resistance.

Increased infiltration inhibition can be achieved by impregnation with pitch.

The use of a chemical binder in addition to the above-mentioned organic binder make it possible to dispense with a separate firing operation. Even tempering at ca. 180 degrees C. is sufficient to achieve chemical bonding, which confers sufficient strength on the products. Nevertheless, due to the combination with the organic binder, the desired properties of the molding can be achieved even without expensive thermal aftertreatment.

We claim:

1. Process for producing refractory, carbon-bonded ceramic moldings, comprising the following steps:
    (a) forming granules by spraying a low-viscosity organic carbon containing binder onto a coarse fraction of a refractory component, the coarse fraction having a particle size larger than 0.5 mm, while maintaining the coarse refractory fraction in motion during the spraying, (b) spraying or strewing a fine refractory fraction with a particle size smaller than 0.5 mm onto the granules formed, (c) pressing the granules thus produced into moldings, as well as (d) subsequently curing the organic binder and tempering or firing the produced carbon-bonded ceramic moldings.

2. Process in accordance with claim 1, wherein the different components are sprayed or strewn onto the coarse refractory fraction in a fluidized bed.

3. Process in accordance with claim 1, wherein the spraying or strewing of the different fine components is carried out on a granulating plate.

4. Process in accordance with claim 1, wherein a material comprising $Al_2O_3$, $ZrO_2$, $SiO_2$, zircon mullite, $TiO_2$, $Cr_2O_3$, SiC, or recrystallized SiC is used as the coarse refractory fraction.

5. Process in accordance with claim 1, wherein the fine refractory fraction is used at least partially in the micronized form with a particle size of less than 0.01 mm.

6. Process in accordance with claim 1, wherein the organic binder is used in an amount of up to 10 wt. % relative to the total mixture.

7. Process in accordance with claim 1, wherein the coarse and fine fractions are premixed prior to use.

8. Process in accordance with claim 1, wherein another portion of the organic binder and a chemical binder are sprayed onto the granules subsequent to the spraying on of the fine component.

9. Process in accordance with claim 1, wherein another portion of the organic binder or a chemical binder is sprayed onto the granules subsequent to the spraying on the fine component.

10. Process in accordance with claim 1 wherein the fine refractory fraction contains $Al_2O_3$, $ZrO_2$, $TiO_2$, $Cr_2O_3$, zircon mullite, carbides, nitrides, borides, SiAlON compounds, or metals.

11. Process in accordance with claim 10 wherein the carbides are SiC or recrystallized SiC.

12. Process in accordance with claim 10 wherein the metals are Cr or Si.

13. Process in accordance with claim 1, wherein the organic binder is a resin.

14. Process in accordance with claim 13 wherein the resin is selected from the group consisting of phenol-resol resin, phenol-novolak resin, furan resin, and epoxy resin.

15. Process in accordance with claim 1, wherein the chemical binder is a phosphate binder.

16. Process in accordance with claim 15 wherein the phosphate binder is an organically modified phosphoric acid.

17. Process in accordance with claim 1 wherein a further, carbon-containing component, especially in the form of powdered graphite, carbon black, or petroleum coke, is sprayed to strewn onto the granules formed previously or in situ before, after or together with the fine refractory fraction.

18. Process in accordance with claim 17, wherein the fine refractory fraction or the other carbon-containing component is sprayed on in the form of a suspension in alcohol or water.

19. Process in accordance with claim 17, wherein another portion of the organic binder and a chemical binder are sprayed onto the granules subsequent to the spraying on the fine component and the further carbon-containing component.

20. Process in accordance with claim 17, wherein another portion of the organic binder and a chemical binder are sprayed onto the granules subsequent to the spraying on the fine component or the further carbon-containing component.

21. Process in accordance with claim 17, wherein another portion of the organic binder or a chemical binder is sprayed onto the granules subsequent to the spraying on of the fine component and the further carbon-containing component.

22. Process in accordance with claim 17, wherein the fine refractory fraction and the other carbon-containing component are sprayed on in the form of a suspension in alcohol or water.

23. Process in accordance with one of the claim 17, wherein another portion of the organic binder or a chemical binder is sprayed onto the granules subsequent to the spraying on of the fine component or the further carbon-containing component.

24. Process in accordance with claim 23, wherein the chemical binder is used in an amount of up to 3 Wt. % relative to the total mixture.

25. Process for producing refractory, carbon-bonded ceramic moldings, comprising the following steps:

(a) spraying a low-viscosity organic carbon containing binder onto a coarse fraction of a refractory component, the coarse fraction having a particle size larger than 0.5 mm, while maintaining the coarse refractory fraction in molten while spraying, to form coated granules, (b) spraying or strewing a fine refractory fraction having a particle size smaller than 0.5 mm onto the coated granules, (c) pressing the granules produced in step (b) into moldings, and (d) subsequently curing the organic binder in the moldings and tempering or firing the moldings to produce carbon-bonded ceramic moldings, wherein powdered graphite, carbon black, or petroleum coke is sprayed or strewn onto the coated granules formed in step (b), wherein another portion of the organic binder and a chemical binder are sprayed onto coated the granules subsequent to the spraying on of the fine component and the powdered graphite, carbon black, or petroleum coke, wherein the fine refractory fraction is sprayed or strewn onto the coated granules formed in step (2) in a fluidized bed, wherein the fine refractory fraction and the powder graphite, carbon black, or petroleum coke are sprayed on in the form of a suspension in alcohol or water, wherein a material comprising $Al_2O_3$, $ZrO_2$, $SiO_2$, zircon mullite, $TiO_2$, $Cr_2O_3$, SiC, or recrystallized SiC is used as the coarse refractory fraction, wherein a material comprising $Al_2O_3$, $ZrO_2$, $TiO_2$, $Cr_2O_3$, zircon mullite, carbides, nitrides, borides, SiAlON compounds, or metals are used as the fine refractory fraction, wherein at least a portion of the fine refractory fraction is in a micronized form with a particle size of less than 0.01 mm, wherein a phenol-resol resin, phenol-novolak resin, furan resin, or epoxy resin is used as the organic binder, wherein the organic binder comprises an amount of up to 10 wt. % relative to the total mixture, wherein an organically modified phosphoric acid is used as the chemical binder, and wherein the chemical binder comprises an amount of up to 3 Wt. % relative to the total mixture.

* * * * *